(12) United States Patent
Reardon (10) Patent No.: US 8,352,364 B2
(45) Date of Patent: *Jan. 8, 2013

(54) FINANCIAL TRANSACTION SYSTEM WITH INTEGRATED ELECTRONIC MESSAGING, CONTROL OF MARKETING DATA, AND USER DEFINED CHARGES FOR RECEIVING MESSAGES

(76) Inventor: David C. Reardon, St. Charles, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,921

(22) Filed: Dec. 21, 2010

(65) Prior Publication Data

US 2011/0112966 A1 May 12, 2011

Related U.S. Application Data

(63) Continuation of application No. 11/063,076, filed on Feb. 22, 2005, now Pat. No. 7,873,572.

(60) Provisional application No. 60/547,462, filed on Feb. 26, 2004.

(51) Int. Cl.
*G06Q 40/00* (2012.01)
(52) U.S. Cl. .............. 705/39; 705/35; 705/40; 705/42
(58) Field of Classification Search .............. 705/15–45, 705/64, 65, 306, 400
See application file for complete search history.

(56) References Cited

U.S. PATENT DOCUMENTS

| | | | |
|---|---|---|---|
| 5,220,501 A | 6/1993 | Lawlor et al. | |
| 5,327,486 A | 7/1994 | Wolff et al. | |
| 5,329,589 A | 7/1994 | Fraser et al. | |
| 5,473,671 A | 12/1995 | Partridge, III | |
| 5,625,680 A | 4/1997 | Foladare et al. | |
| 5,742,668 A | 4/1998 | Pepe et al. | |
| 5,790,790 A | 8/1998 | Smith et al. | |
| 5,826,241 A | 10/1998 | Stein et al. | |

(Continued)

FOREIGN PATENT DOCUMENTS

JP 08-339407 12/1996

(Continued)

OTHER PUBLICATIONS

"Viking Systems, Inc. and Netnote International, Ltd. Sign Agreement for Use and Distribution of E-commerce Technologies", Business Editors, Business Wire, New York: Feb. 18, 1999, p. 1. ProQuest retrieved.*

(Continued)

*Primary Examiner* — Hai Tran
(74) *Attorney, Agent, or Firm* — Thompson Coburn LLP (57) ABSTRACT

A method of performing financial transactions between users of Summa accounts, each Summa account including an electronic messaging system that provides for crediting and debiting at least one financial account associated with each Summa account. The invention also allows each user to define a schedule of receipt charges associated with the identities of other users to be charged as compensation for accepting delivery of their messages. With the user's permission, a record of purchases made from the Summa account may be maintained in a marketing database, increasing the value of use's market identity and the corresponding value of receipt charges they user may collect. Major benefits of the invention include, but are not limited to: (1) electronic financial transactions are completed in a more secure manner with appropriate tracking and verification, (2) message recipients receive income from the value of their market identities, and (3) commercial enterprises can more readily identify individuals interested in receiving their commercial offers.

25 Claims, 5 Drawing Sheets

U.S. PATENT DOCUMENTS

| | | | |
|---|---|---|---|
| 5,828,737 | A | 10/1998 | Sawyer et al. |
| 5,835,087 | A | 11/1998 | Herz et al. |
| 5,960,411 | A | 9/1999 | Hartman et al. |
| 5,987,606 | A | 11/1999 | Cirasole et al. |
| 5,999,967 | A | 12/1999 | Sundsted |
| 6,005,870 | A | 12/1999 | Leung et al. |
| 6,023,723 | A | 2/2000 | McCormick et al. |
| 6,029,150 | A | 2/2000 | Kravitz |
| 6,047,272 | A | 4/2000 | Biliris et al. |
| 6,061,718 | A | 5/2000 | Nelson |
| 6,064,723 | A | 5/2000 | Cohn et al. |
| 6,073,167 | A | 6/2000 | Poulton et al. |
| 6,112,227 | A | 8/2000 | Heiner |
| 6,161,130 | A | 12/2000 | Horvitz et al. |
| 6,192,114 | B1 | 2/2001 | Council |
| 6,199,102 | B1 | 3/2001 | Cobb |
| 6,209,095 | B1 | 3/2001 | Anderson et al. |
| 6,233,584 | B1 | 5/2001 | Purcell |
| 6,240,408 | B1 | 5/2001 | Kaufman et al. |
| 6,246,996 | B1 | 6/2001 | Stein et al. |
| 6,253,198 | B1 | 6/2001 | Perkins et al. |
| 6,253,201 | B1 | 6/2001 | Abdel-Mottaleb et al. |
| 6,330,550 | B1 | 12/2001 | Brisebois et al. |
| 6,332,134 | B1 | 12/2001 | Foster |
| 6,393,464 | B1 | 5/2002 | Dieterman |
| 6,393,465 | B2 | 5/2002 | Leeds |
| 6,393,568 | B1 | 5/2002 | Ranger et al. |
| 6,408,284 | B1 | 6/2002 | Hilt et al. |
| 6,421,709 | B1 | 7/2002 | McCormick et al. |
| 6,438,584 | B1 | 8/2002 | Powers |
| 6,446,115 | B2 | 9/2002 | Powers |
| 6,453,327 | B1 | 9/2002 | Nielsen |
| 6,484,197 | B1 | 11/2002 | Donohue et al. |
| 6,493,007 | B1 | 12/2002 | Pang |
| 6,587,550 | B2 | 7/2003 | Council et al. |
| 6,618,160 | B1 | 9/2003 | Kato et al. |
| 6,654,787 | B1 | 11/2003 | Aronson et al. |
| 6,697,462 | B2 | 2/2004 | Raymond |
| 6,708,205 | B2 | 3/2004 | Sheldon et al. |
| 6,732,149 | B1 | 5/2004 | Kephart |
| 6,732,154 | B1 | 5/2004 | Poulton et al. |
| 6,868,498 | B1 | 3/2005 | Katsikas |
| 7,003,306 | B2 | 2/2006 | Henry-Labordere et al. |
| 7,076,458 | B2 | 7/2006 | Lawlor et al. |
| 7,089,208 | B1 * | 8/2006 | Levchin et al. ......... 705/39 |
| 7,191,151 | B1 | 3/2007 | Nosek |
| 7,236,969 | B1 | 6/2007 | Skillen et al. |
| 7,249,060 | B2 | 7/2007 | Ling |
| 7,249,094 | B2 | 7/2007 | Levchin et al. |
| 7,257,246 | B1 | 8/2007 | Brodie et al. |
| 7,257,530 | B2 | 8/2007 | Yin |
| 7,269,160 | B1 | 9/2007 | Friedman et al. |
| 7,376,587 | B1 * | 5/2008 | Neofytides et al. ......... 705/26.35 |
| 7,395,241 | B1 | 7/2008 | Cook et al. |
| 7,415,409 | B2 | 8/2008 | Simoneau et al. |
| 7,415,460 | B1 | 8/2008 | Phillips et al. |
| 7,430,537 | B2 | 9/2008 | Templeton et al. |
| 7,641,113 | B1 | 1/2010 | Alvarez et al. |
| 2002/0052855 | A1 * | 5/2002 | Landesmann ......... 705/400 |
| 2002/0120582 | A1 | 8/2002 | Elston et al. |
| 2003/0009698 | A1 | 1/2003 | Lindeman et al. |
| 2003/0023736 | A1 | 1/2003 | Abkemeier |
| 2003/0080185 | A1 | 5/2003 | Werther |
| 2003/0182230 | A1 | 9/2003 | Pessin |
| 2003/0220779 | A1 | 11/2003 | Chen et al. |
| 2004/0165707 | A1 | 8/2004 | Raymond |
| 2005/0188045 | A1 | 8/2005 | Katsikas |
| 2005/0192078 | A1 | 9/2005 | Jawaharlal |
| 2005/0192893 | A1 * | 9/2005 | Keeling et al. ......... 705/39 |
| 2005/0192899 | A1 | 9/2005 | Reardon |
| 2006/0041505 | A1 | 2/2006 | Enyart |
| 2006/0213968 | A1 | 9/2006 | Guest et al. |
| 2006/0253389 | A1 | 11/2006 | Hagale et al. |
| 2007/0203836 | A1 | 8/2007 | Dodin |

FOREIGN PATENT DOCUMENTS

| | | |
|---|---|---|
| JP | 2002-041408 | 2/2002 |
| JP | 2003-157215 | 5/2003 |
| JP | 2004-013655 | 1/2004 |
| WO | 0153977 | 7/2001 |

OTHER PUBLICATIONS

"Eastman Software Broadens Family of Messaging-Based Work Management Momentum for Delivering Work Management to Mainstream Markets", PR Newswire, New York, May 11, 1998, p. 1. ProQuest retrieved.*

Altoft, Patrick, SEO Blog—Internet Marketing News: Google Patents SMS Payment System, SEOptimise, Sep. 2, 2007, www.seoptimise.com/blog/2007/09/google-patents-sms-payment-system.html, 6 pages.

Bandar, Ehab, Google Patents Gpay for Paying on the Go, Banking Unwired, Sep. 3, 2007, www.bankingunwired.com/2007/09/03/google-patents-gpay-for-paying-on-the-go/, 6 pages.

Bray, Hiawatha, A chance to board the e-mail gravy train, The Boston Globe, Mar. 15, 2004, 2 pages.

Claburn, Thomas, The War on Spam Takes a Novel Turn, Information Week, May 17, 2005, 4 pages.

Copending U.S. Appl. No. 12/261,764 entitled System and Method for Transferring Funds to Recipients of Electronic Messages, filed on Oct. 30, 2008 in the name of David C. Reardon, et al.

Guth, Robert, Microsoft to Launch Cashback Search Services, The Wall Street Journal Online, May 21, 2008, 1 page.

Internet Pionees Joins Vanquish, Yahoo! Finance, Jun. 16, 2004, 1 page, Yahoo! Inc.

Kille, Steve, Lemonade: Important Open Standard for Mobile Devices, Ferris Research, May 25, 2005, www.ferris.com/2005/05/25/lemonade_import/, 1 page.

Malo, Jim, Money talks: Make spammers pay to send you e-mail, Mass High Tech, Feb. 2, 2004, 1 page.

Martin, Richard, Google Applies for 'GPay' Mobile Payments Patent, Information Week, Sep. 4, 2007, www.informationweek.com/news/mobility/showArticle.jhtml?articleID=201804016, 7 pages.

Obopay, date unknown, www.obopay.com/consumer/jsp/html/aim_info.html, 1 page.

Office Action for EP Application 05723603.6-2221 dated Aug. 5, 2008.

Office Action for U.S. Appl. No. 11/063,076 dated Dec. 22, 2009.

Office Action for U.S. Appl. No. 11/063,076 dated Jan. 7, 2009.

Office Action for U.S. Appl. No. 11/063,076 dated Jun. 18, 2009.

Open Standards: The best approach for Mobile Messaging, Isode, May 22, 2005, www.isode.com/whitepapers/lemonade-open-standards.html, 4 pages.

Parker Wayne & Kent, Blackberry's Mobile Email Dominance Threatened by Lemonade Server, SourceWire, Oct. 3, 2006, www.sourcewire.com/releases/rel_display.php?relid=27424&hilite=, 4 pages.

Raymond, Philip, Pay for E-mail Crowd Missing the Point, ChickZFeatures, Feb. 17, 2004, 2 pages.

Raymond, Philip, Spam, Economics and Democracy, Jan. 25, 2005, 8 pages, V 3.0, Vanquish, Inc.

Raymond, Philip, What's New at Vanquish?, May 17, 2005, 3 pages.

Riley, Duncan, Could Gpay Be Google's Killer Phone App?, TechCrunch, Sep. 2, 2007, www.techcrunch.com/2007/09/02could-gpay-be-googles-killer-phone-app/, 14 pages.

Shaffer, Scott P., Obopay, An M-Commerce Solution?, The Pondering Primate, Mar. 8, 2006, theponderingprimate.blogspot.com/2006/03/obopay-m-commerce-solution.html, 18 pages.

Third Party Submission in Published Application for U.S. Appl. No. 11/364,571 in the name of Ramy Dodin, filed Oct. 19, 2007 by Vern Maine & Associates, 11 pages.

Wetzel, Rebecca, Spam Fighting Business Models—Who Wins, Who Loses, Business Communications Review, Apr. 2004, pp. 24-29 (6 pages).

Wolverton, Troy, PayPal sued in patent dispute, CNET News, May 15, 2002, news.cnet.com/PayPal-sued-in-patent-dispute/2110-1017_3-914619.html.

\* cited by examiner

Figure 1

| 80 | 82 | 84 | 86 | 88 |
|---|---|---|---|---|
| General Information | Personal Contacts List | Consumer Profile List | Commercial Fee List | "Refused" List |
| User20 ID | User20 ID | User20 ID | User20 ID | User20 ID |
| Password = Mama143 | User13@sn1 = $0.10 | male between 30 and 45 | Fishing = $0.05 | pesky1@sn1 |
| Current Balance = $121.73 | User22@sn2 = $0.55 | annual income $52,000 | Investment Newsletters = $1.20 | pesky2@porn.com |
| This Month's Total Receipt Charges = $22.35 | Mama@msn.net = $0.00 | Fishing Interest = 10 | Opera = $10.00 | |
| Default Receipt Charge = $0.05 | pesky@sn2 = $2.50 | Investment Newsletters Interest = 4 | Lenders = $10.00 | |
| | | Opera Interest = 0 | Weight Loss = $3.00 | |

FINANCIAL TRANSACTION SYSTEM WITH INTEGRATED ELECTRONIC MESSAGING, CONTROL OF MARKETING DATA, AND USER DEFINED CHARGES FOR RECEIVING MESSAGES

RELATED APPLICATION DATA

This application is a continuation of application Ser. No. 11/063,076, filed Feb. 22, 2005, now U.S. Pat. No. 7,873,572 published as US Patent Publication No. 2005-0192899 and currently pending, which claims the benefit of provisional application Ser. No. 60/547,462, filed Feb. 26, 2004, the disclosures of which are all incorporated by reference herein.

BACKGROUND OF THE INVENTION

1. Field of the Invention

This invention relates generally to electronic messaging and, more particularly, to secure electronic messaging which assures the security of financial transactions and avoids the current difficulties experienced by users of electronic messaging for performing financial transactions.

2. Description of the Prior Art

The use of the internet for business and personal communications has been hampered by fears regarding (a) the security of financial transactions, (b) abuse of email addresses, (c) misuse of confidential information, and (d) inconveniences posed by solutions to the first three problems.

Regarding abuse of email, solutions for spam often rely on filtering, which risks blocking wanted messages; white and black lists, which, respectively, allows or blocks email based on the source; and challenge response systems, for example, U.S. Pat. No. 6,393,465 to Leeds. Another approach involves erecting financial disincentive to spam. U.S. Pat. No. 5,999,967 to Sundsted describes requiring an "electronic stamp" to be attached to emails which allows the receiver to "bill the sender for the agreed amount if he accepts the electronic mail." Alternatively, the sender can purchase an electronic stamp from a third party from whom the receiver can subsequently collect the funds. U.S. Pat. Nos. 6,192,114 and 6,587,550 to Council disclose a method wherein unauthorized senders are sent an electronic bill that must be paid prior to delivery of the email. U.S. Pat. No. 6,697,462 to Raymond discloses methods wherein unauthorized senders are required to post a bond against which service providers will deduct a penalty if notified that the recipient did not want the message that was delivered.

Regarding the abuse of confidential information, even wanted communications and transactions with merchants increases the risk of subsequent abuse of email addresses, credit card numbers, or other supplied information. To avoid internet distribution of credit card numbers, U.S. Pat. No. 6,246,996 to Stein discloses a mechanism for a seller to bill a buyer through an intermediary's email system. The bill is forwarded to the buyer through an intermediary service's email system and when the buyer responds with authorization to pay the bill, the intermediary can process the transaction without conveying any account information to the seller. Alternatively, U.S. Pat. No. 6,332,134 to Foster avoids disclosure of credit card information to merchants by providing for the customer to initiate an electronic message to the financial institution authorizing payment to a merchant identified in the message to the financial institution. Another attempt to limit information provided is disclosed by U.S. Pat. No. 6,330,550 to Brisebois, using a consumer profile server.

Unwanted email results in loss of time and productivity to such a degree that many people actively seek to hide their email addresses in order to be protected from "spam". This defeats the goal of being able to more easily communicate with people and businesses with whom communications are actively sought. The same concern exists regarding unwanted telemarketing calls. Therefore, there is a need for a system that creates a proper balance between privacy concerns and the need for efficient marketing of desirable products.

The problems outlined above cannot be adequately addressed with the existing systems for electronic funds transfer and email, the latter employing SMTP and POP3 protocols. Accordingly, there is a need for a new electronic communication system that give a user (a) greater control over the time he spends reviewing both expected and unexpected communications, (b) greater value from information shared about his market identity, and (c) greater convenience and security in the completion of financial transactions.

The present invention achieves these ends by (a) integrating a secure messaging system into a electronically controlled financial account for each user that allows both the sending and receipt of funds as part of an email to another party using a similar email enabled financial account, (b) allowing a user to specify a schedule of receipt charges required to receive email from specific individuals, groups of individuals, or classes of businesses, and (c) collecting marketing information about the user's purchases made using this financial account, with the user's permission, so that it may be sold to marketers and thereby increase the income that the user will receive from receipt charges. None of these three features, individually or in combination, is presently known.

GLOSSARY

The following glossary of technical terms used repeatedly throughout this disclosure will be of substantial benefit for the reader to understand the invention:

Digital Identification, or DI, refers to a legally binding electronic signature, a digital signature (DS), or an electronic confirmation of identity that may be in the form of an asynchronously encrypted, verifiable certificate of authority (CA) issued by a trusted third party, such as a bank or post office, that attests for the identity of the designated holder.

Header refers to information associated with a Summa message (see definition below) that is not normally viewed by the receiver but is used by the servers and clients to process the message and balance the accounts.

Network server refers to software and hardware employed by the service provider to collect and distribute information between Summa account (see definition below) clients.

Receipt charge is the charge set by the receiver of a Summa message (see definition below) to be applied against the account of a sender and credited to the receiver as generally or specifically defined in the charge schedule.

Receiver refers to the user of a Summa account (see definition below) who receives a Summa message (see definition below).

Sender refers to the user who sends a Summa message (see definition below).

Service provider refers to an entity that provides Summa accounts (see definition below) to a plurality of users through at least one Summa network server. Typically, the service provider may be a bank or other financial institution, an internet service provider, or another business offering or managing credits accessible to users through a Summa account (see definition below).

Summa account refers to an electronically managed financial account that includes an integrated electronic messaging system or, conversely, an electronic messaging system that is integrated into the electronic management of one or more financial accounts. Alternatively, a Summa account may be composed of an electronic messaging system that includes the programming and authorizations necessary to credit or debit to one or more financial accounts.

Summa client refers to the software resident on a user's machine for composing, sending, receiving, and reading a Summa message (see definition below) and accessing the associated financial account(s) and account records.

Summa message refers to an electronic message containing information regarding a transfer of funds between Summa accounts and which may also include additional information, messages or attachments from the sender to the receiver. In addition to designating a transfer of funds, the Summa message may include electronic text, images, audio, video, or telephonic communications.

User refers to any person or business entity with a Summa account on the network. A user may be either the receiver or sender of a Summa message.

It was in light of the foregoing that the present invention was conceived and has now been reduced to practice.

SUMMARY OF THE INVENTION

According to the preferred embodiment of this invention, prior to making a financial transfer, each Summa user must have established a financial account with his Summa service provider. This account must include either or both deposits of funds or a line of credit.

Through the Summa client, by which the user accesses and manages one or more Summa accounts, the user defines a schedule of receipt charges that senders must pay to the receiver as compensation for accepting delivery of their Summa messages. Upon delivery of a Summa message, the sender's Summa account is debited the agreed upon charge(s) and the sender's account is credited the charge, minus any service fees that may be imposed by the service provider.

In addition to providing a technique for receivers to establish and collect message receipt charges, this invention also provides a secure manner of transferring other funds between any two Summa accounts. This facilitates internet purchases, micropayments, electronic invoicing and bill payment, and any other transfer of funds that user may require. Since this payment involves a transfer of funds directly between Summa accounts, there is no need to transmit credit card numbers or account numbers over the internet.

In addition, with the permission of users, the service providers can also track the types of purchases made and add this to the marketing database kept on each user. Collecting and making this data available increases the value of each user's market identity and thereby increases the income that users will be able to receive from receipt charges.

In regard to the schedule of receipt charges, users will typically provide that persons from whom they most wish to receive Summa messages will be charged nothing or only a little. A "standard charge" of five cents, for example, would help protect the user from spam. Furthermore, the schedule of charges to be applied for receipt of commercial messages may be set by commercial categories. The charge for receiving messages would typically be set low for the type of commercial messages most desired by a particular user and highest for the least desired commercial messages. High charges would also be applied to categories where the users know they are high-valued prospects.

By establishing a charge schedule for receipt of commercial messages, the individual is providing marketing information that is useful for commercial enterprises. The service provider can sell or lease this electronically generated list of addresses to businesses who are then able to send commercial messages that receivers want, or are at least open to receiving, at a known charge.

Through this process the following advantages are obtained: (1) "spamming" of untargeted commercial offers or private messages is eliminated because users only receive messages that they agree to receive according to their schedule of charges, (2) receivers are provided with income for the value of their time and market identity, (3) Summa service providers obtain additional service charge and advertising revenue, (4) commercial enterprises can more readily obtain lists of individuals interested in receiving their commercial offers through Summa messages, and (5) electronic financial transactions can be completed in a secure manner with better tracking and verification.

A primary feature, then, of the present invention is the provision of a user-friendly financial transaction system using the Internet that will enjoy the confidence of its users.

Another feature of the present invention is the provision of such a transaction system which offers a user greater control over the time he spends reviewing both expected and unexpected communications, greater value from information shared about his market identity, and greater convenience and security in the completion of financial transactions.

Still another feature of the present invention is the provision of a transaction system which connects a secure messaging system to an electronically controlled financial account for each user that allows both the sending and receipt of funds as part of an email to another party using a similar Summa account, allows a user to specify a schedule of receipt charges required to receive email from specific individuals, groups of individuals, or classes of businesses, and collects marketing information about the user's purchases made using this financial account, with the user's permission, so that it may be sold to marketers and thereby increase the income that the user will receive from receipt charges.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

At this point, it is deemed worthwhile to consider some examples of known patented systems, and then reflect on the benefits achieved by the present invention and not found in the prior art.

U.S. Pat. No. 5,999,967 to Sundsted discloses a method of electronic mail filtering that uses an email attachment representing an electronic stamp having 'intrinsic" or negotiable value. It is especially noteworthy that this technique is expressly described as for the purpose of being able to "more effectively identify and process junk electronic mail." In other words, Sundsted does not disclose a better way to transfer finds or capture value from one's time or market identity. His main concern is creating an economic barrier (through the electronic stamp) to span, and secondarily, a bidding system by which commercial advertisers may seek to overcome this barrier by applying an electronic stamp of equal or greater value than the amount required by recipients.

By contrast, the present invention does not use an email attachment of value but instead vaults beyond the promise to pay and Sunsted's unaddressed task of collecting funds by providing a mechanism for initiating and completing an actual transaction or deposit of funds from one financial account to another. This occurs, and is integral to the definition of delivering a Summa message (that is, a financial transaction plus a message).

This distinction is made clearer by noting that Sundsted requires the conversion of the electronic stamp into a bill or promissory note that must be submitted to person authorizing the payment. Alternatively, fie suggests that a user might purchase tokens that may be redeemed and converted into negotiable currency through a third party token provider. The present invention eliminates the need to collect payment for "electronic stamps" either through promissory notes or third party tokens by disclosing a mechanism for electronically transferring real money, in the form of national or foreign currency, from one financial account to another.

Notably, Sundsted does not discuss or make provision for using the promissory notes or tokens for any other purpose than its one time use as attached electronic postage. In fact, it appears that he speaks against the reusing of the tokens or promissory notes by providing the use of a history log that rejects any token or electronic stamp that has previously been used. This underscores that the electronic stamp as an "indicator of value" taught by Sundsted is not negotiable currency that can be used for new purchases, to pay bills, or even used for outgoing electronic stamps.

In addition. Sundsted provides no mechanism for users to set different required charges for different senders. Indeed, he suggests the use of a single required postage charge for all messages to be received.

Another problem with Sundsted resides in his scheme for preventing reuse of electronic stamps by means of a history log which would be unworkable unless the receiver has access to full history of all electronic stamps and tokens that have been sent not only to the current user, but to all users of the system. Such a problem does not present itself when using a real currency deposited in a real financial account as provided by the present invention.

U.S. Pat. Nos. 6,192,114 and 6,587,550 to Council disclose a method of filtering email by sending unauthorized senders (that is, persons not on the receiver's pass-through or white list) an electronic bill that must be paid prior to delivery of the email. He also provides that senders (most likely, large commercial advertisers) may pre-authorize payment of delivery charges by establishing a billing account or credit card number with the service provider. He also describes a means for responding to unauthorized messages with a bill including a link through which the unauthorized sender may pay the bill that will trigger delivery of the unauthorized message.

As in the case of Sundsted, Council fails to discover the advantage of creating a financial account into which funds can be deposited from the billed receipt charges and withdrawn to make purchases, pay bills, or pay other person's receipt charges. Council also fails to discover the advantages that arise from allowing users to create a schedule of different receipt charges according to specific sender or broader commercial classes. Council also requires users to maintain a list of authorized senders and seeks to bill senders who are not on that list. In contrast, the present invention simplifies the relationship between all users in that any person with a Summa account, even those unknown to user, are automatically pre-authorized to send messages and does not require any billing process to collect payment of delivery charges. Moreover, Council does not provide a mechanism for users to have accounts with different service providers, but would require the bills to all be paid to a single company that provides this service. Another concern is that Council requires the receiving user's computer to be programmed to detect an indication of the source of electronic mail and the ability to compare the source with a list of authorized senders. However, as described, the system of Council cannot prevent false headers. It has no means of determining if the indication of origin is genuine. By contrast, the system of the invention does not require the receiving person's computer to detect of the source of the email since the Summa network itself is designed to authenticate the identity of users.

U.S. Pat. No. 6,697,462 to Raymond discloses a method of regulating electronic communications that includes the steps of receiving a communication from a sender for a designated recipient, comparing sender identity indicia attached to the communication with stored sender identity indicia in a database under the control of the recipient, and presenting the communication to the recipient for acceptance or rejection, when the sender identity indicia is determined to be acceptable. The method further at least includes the steps of sending a return message to the sender indicating that a bond must be posted when the sender identity indicia is not determined to be acceptable, and that money associated with the bond shall be forfeited if the communication is presented to the recipient and the recipient rejects the communication, dissolving the bond when the recipient accepts the communication, and causing the money associated with the bond to be forfeited when the recipient rejects the communication. The present invention does not contemplate posting a bond in order to have a secure internet transaction.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
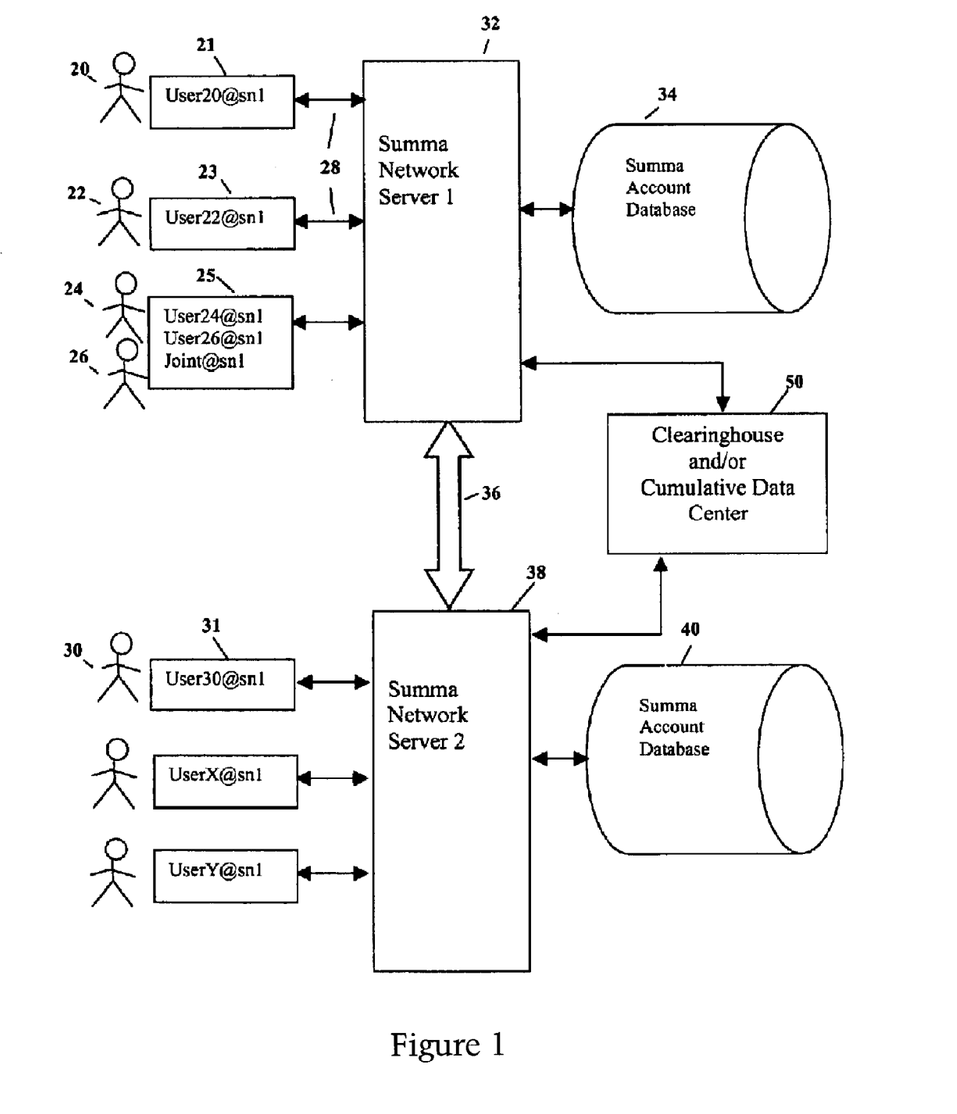
FIG. 1 is a block diagram showing the relationship between Summa users, network servers, and the databases associated with each user's Summa account, all according to the invention.

Refer now to the drawings and, initially, to FIG. 1 which illustrates the unique technique of the invention as it is achieved and controlled by the use of a computer network wherein network servers 32 and 38 exchange Summa messages through an electronic connection 36. Although the present invention will be described with reference to the embodiments shown in the drawings, it should be understood that the present invention can be embodied in many alternate forms or embodiments. Any suitable size, shape or type of elements or materials may be used to practice the invention.

As seen in FIG. 1, Individual users 20, 22, 24, 26 and 30 each have access to at least one Summa client. User 20, for example, has access to Summa client 21. Users 24 and 26 have access to a shared computer running a Summa client 25 which has settings to send and retrieve Summa messages for three account addresses, one for User 24, user24@sn1, one for user 26, user26@sn1, and one that is shared by both user 24 and user 26, joint@sn1. Through their respective Summa clients, users communicate with their assigned network server, 32 or 38. For example, Summa client 21 is shown as connected to network server 32 via an internet connection 28. If user 20 sends a message addressed to user 22, network server 32 will store the message received from Summa client 21 in memory until it is retrieved by user 22's Summa client, 23.

The exchange of messages between users that are serviced by different servers is only slightly more complex. For example, assume that user 24 wishes to transmit a message to user 30 who is served by server 38. The address of the receiver, user 30, would be recognized by server 32 as directed to a user associated with network server 38, and relayed to the network server 38 via the network connection 36. The message routing software of the server 38 will automatically parse the address for the receiver and identify that the message is to be delivered to user 30. If it was determined that the message was to be delivered, it would be stored in a file accessible for retrieval via that user's Summa client, 31.

The foregoing description is commonly understood by those familiar with the art of electronic messaging. In this invention, however, another element is added to this common scheme. Namely, the Summa network servers also maintain financial accounts and databases 34 and 40 for each user which include a schedule of charges to be charged against the accounts of senders and credited to each user on delivery and the means to debit or credit the financial accounts upon delivery of the Summa message.

Figure 2:
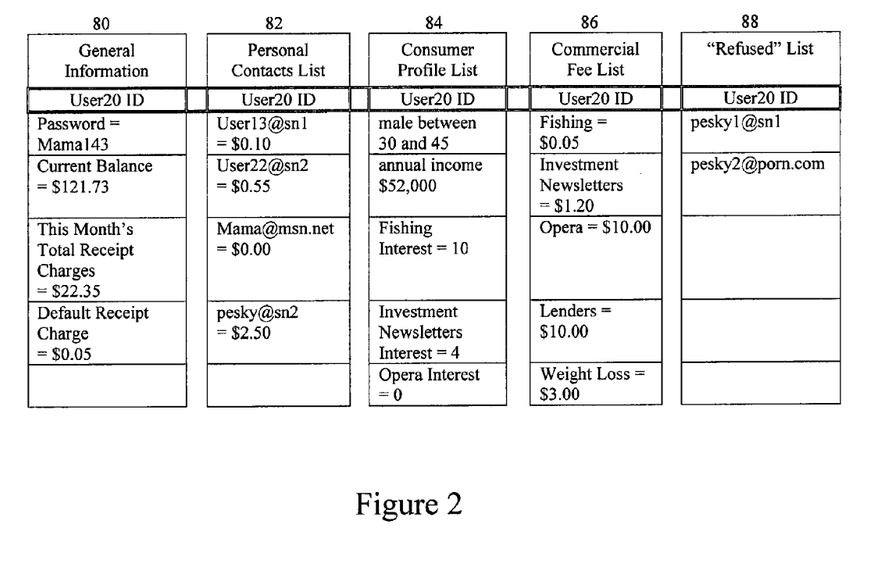
FIG. 2 is a spreadsheet that illustrates an example of the type of information maintained in the database associated with a user account according to the invention.

A general example of the charge schedule and consumer profile for user 20 is entered and stored in database 34, as shown in FIG. 2. In this figure, each column represents a separate category of information. For the sake of this discussion, each column, 80 through 88, represents a discrete file. Other arrangements of the data will be obvious to those skilled in the art. As shown in FIG. 2, the first row of each file is a label for the type of information stored in that file and the second row is a unique identifier for user 20, shown simply as "User20 ID" in this example, which is used to identify, link, and access the appropriate data for user 20 across the several files.

In this example, a general information data file 80 is the memory location in which running totals of user 20's credits, debits, and service charges are maintained, along with other standard information such as passwords and the default receipt charge. A personal contacts list file 82 is a list of users known to user 20 for whom user 20 wishes to establish a receipt charge that is different from the default receipt charge. Any address identified as having a receipt charge equal to zero is tagged for the pass through list. A consumer profile list file 84 contains data regarding the consumer profile for user 20, for example, likes and dislikes, product preference, recent purchases, and demographic information. A commercial fee list file 86 contains the charge schedule defined by user 20 that should be applied against various types of commercial accounts. A "refused list" file 88 is a list of user addresses that user 20 wants to have automatically returned or discarded regardless of the maximum receipt charge they are willing to pay.

Figure 3:
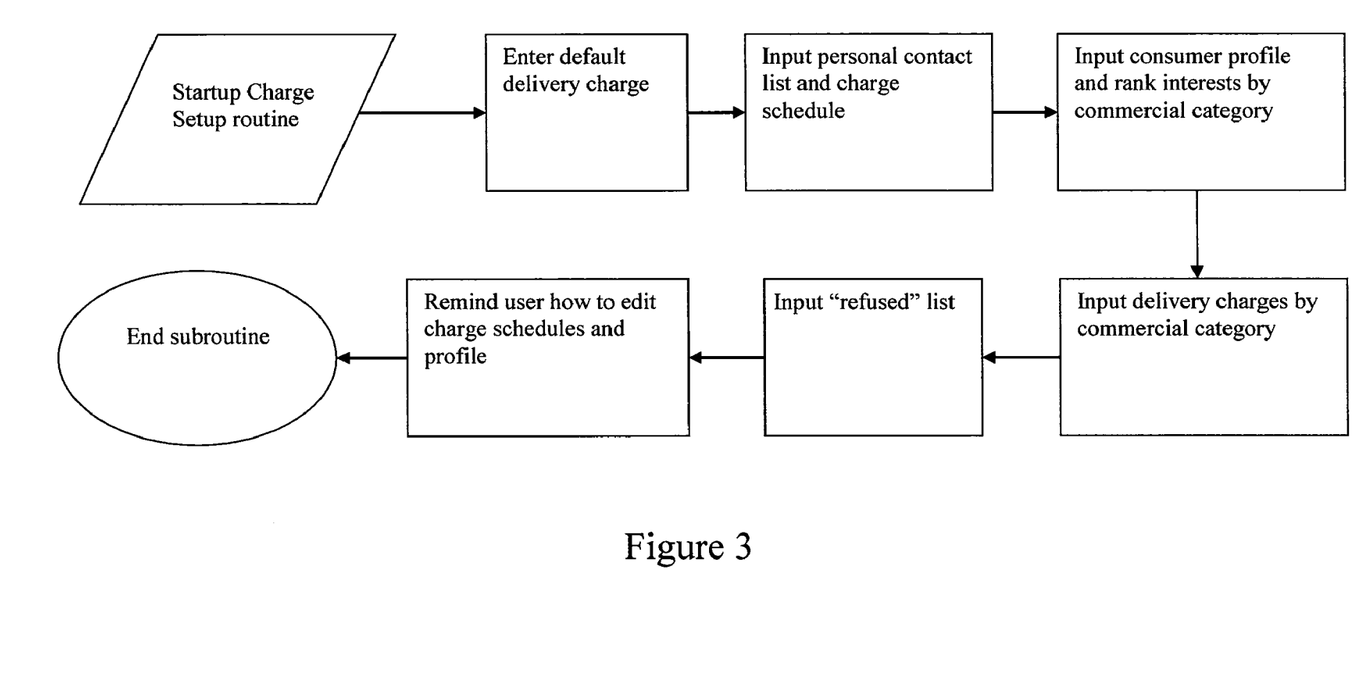
FIG. 3 illustrates a simple flow chart of a software subroutine used by the user, according to the invention, to set the schedule of charges to be demanded of those who wish to send messages to the user.

At the time of establishing a new Summa account, or at such other times as the service provider or customer may wish to modify his account settings, the owner of the Summa address completes or amends an electronic form that establishes the basic charge schedule. FIG. 3 is a flow chart demonstrating the basic steps of a software subroutine by which a user would supply the information stored in the database illustrated in FIG. 2. The ordering of these steps is not crucial. Persons skilled in the art of computer programming will readily derive many variations on this procedure. The basic steps of this subroutine would set the user's default receipt charge, allow entry of specific charges to be applied against specific categories of commercial messages, and input of any additional information that may contribute to a consumer profile. The identification of persons who should have a receipt charge different than the default receipt charge and addresses that should be refused are additional modifications of the basic requirements. Specific addresses on these lists may be entered individually or uploaded in the form of the address book files commonly used by email programs. These steps illustrated in FIG. 2 are not exhaustive of all the types of data that can be gathered and stored in the database that would be useful in controlling the exchange of charges and credits in the general manner covered by this invention.

Figure 4:
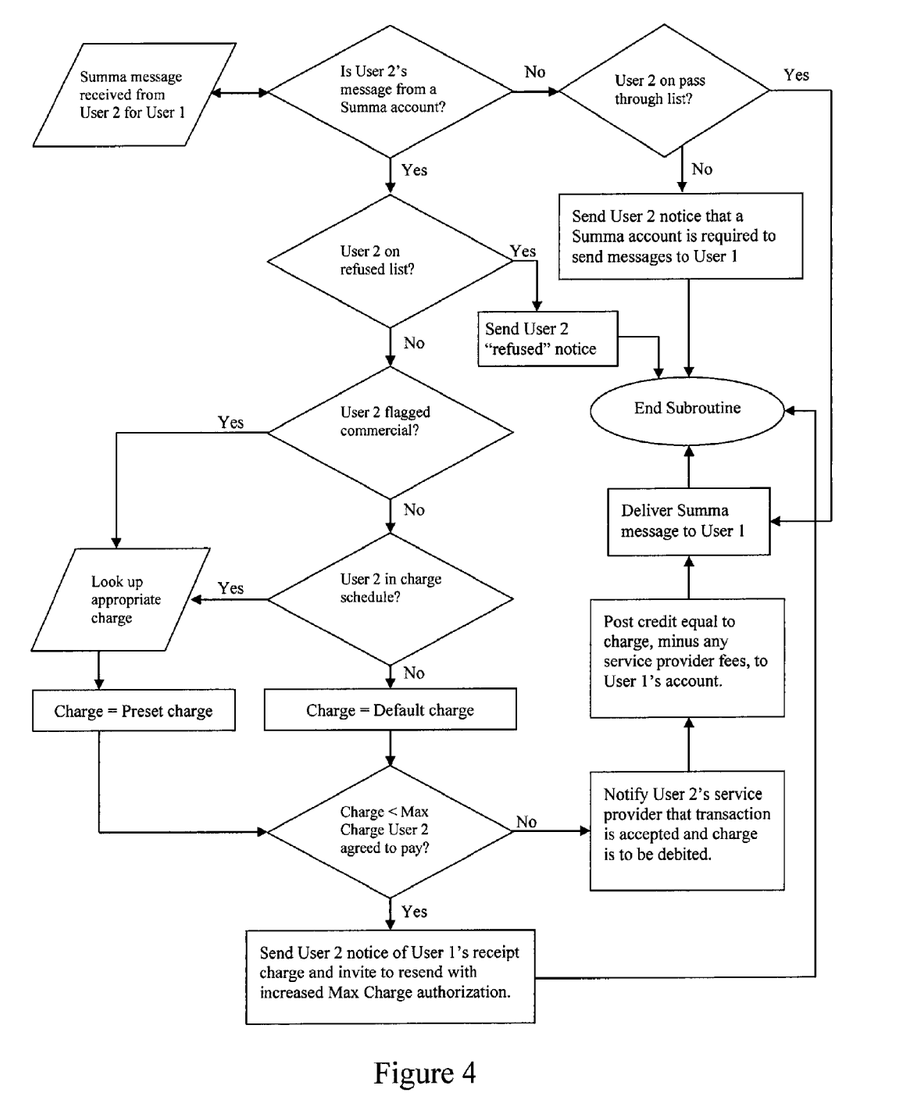
FIG. 4 illustrates a flow chart which is exemplary of a software subroutine used by the network server, according to the invention, to resolve handling a Summa message sent from one user serviced by one server to another user serviced by another server.

FIG. 4 is a basic flow chart that outlines major steps of a server subroutine that examines an incoming Summa message to a receiver and either (1) applies the appropriate charge to the sender's account, provides the credit to the receiver and delivers the Summa message to the receiver, or (2) returns the message to the sender with an appropriate message identifying the reason for refusal. The latter may occur if the sender is on the receiver's list of senders whose messages should always be refused, or if the sender does not have a Summa account or lacks sufficient funds in his account. A message will also be returned if the receiver receipt charge exceeds the maximum amount the sender has listed in the message as the amount he will agree to pay toward a receipt charge. For example, if the user has set a charge of ten cents for receipt of messages from financial newsletters but the sender of such a commercial message has sent the message out with a notice that he will only pay receipt charges up to seven cents per receiver, the sender will receive a notice back stating that the message was not delivered and identifying the appropriate charge that the sender must agree to pay before the message can be delivered. In this manner, senders of commercial broadcast messages can accurately control their costs and also determine what portion of a Summa list they are missing if they have set their maximum charge too low. In a typical embodiment, if the maximum charge the sender is willing to pay exceeds the receiver's receipt charge, only the actual receipt charge is charged against the sender's account.

Since this invention provides a mechanism for the completion of financial transactions and credits, service providers may wish to charge processing fees and the federal, state, and local governments may wish to apply various taxes against these transactions. This involves a splitting of funds, a feature that may also benefit businesses, for example, when splitting payments between a salesman's royalties and the vendor filling an order. In any event where collected monies are required by law, contract, or other agreement to be split between multiple accounts, it is a simple matter to include programming that deducts the appropriate amount from the appropriate side of each transaction and immediately deposits that amount (which may be, for example, a tax, fee, or profit share) into the appropriate account required by governing law or contract or designated by the users. Depending on the requirements, a copy of the original message could be sent to each party receiving a portion of the payment or an alternative message may be automatically generated to satisfy each receiving party's accounting needs. Such messages, if any, might be no more than a tracking number or shipping address. The process of adding additional program steps to apply and track these additional charges is obvious to those skilled in the art.

The steps demonstrated in FIG. 4 are not exhaustive of all possible permutations of a subroutine that would control the delivery of a Summa message. Instead, this flowchart simply shows a typical example of the invention covered by this invention. Many permutations of this approach will be obvious to those skilled in the art of programming.

In a typical embodiment, the secure delivery of the message might require a request to send (RTS) from the sender's server and a permission to send (PTS) from the receiver's server. This step would provide for verification of charges and identities prior to transmission of the Summa message. As an additional security precaution, the RTS might also include a hash sum of the message that will be sent following receipt of the PTS. This would allow the receiver's server to verify that the message received matched the one for which a PTS was granted. Once a PTS was received, the sender's server would place the funds being transferred into a temporary escrow account against the event that the message is not successfully delivered. Once the confirmation of delivery was received from the receiver's server, the escrowed funds would be credited to the receiving party.

In the above example, the transfer of funds is only finalized after the successful delivery of the message has been confirmed. Alternatively, in other circumstances it may be desirable to hold the message until the final transfer of funds has been confirmed. Which alternative is employed may be determined by the type of message or by the selected options of users. Moreover, it is a simple matter to record along with message identifying information, such as a message hash, both the date and time that any Summa message was originally sent and the date and time that it was delivered. This information may be useful in many circumstances as an official date and time stamp which can be confirmed by comparing a copy of the record kept by users against the records kept by the third party service provider.

This flow of funds from users served by one Summa service provider to users served by another service provider will result in a continuous shift of the value of net assets held in user accounts at each service provider. In the preferred embodiment, where the service providers are financial institutions, the balances between service providers might be adjusted through ACH-like transactions that would occur at fixed intervals, for example, at the end of the day. In a typical embodiment, as shown in FIG. 1, this process could be automated through one or more central clearinghouse servers 50 that would monitor, calculate, and process the periodic transfers required to put the net balances of each Summa service provider in proper order. Typically, the central clearinghouse 50 would also maintain the list of all network server addresses for all the Summa service providers and each transaction would begin with a query to the clearinghouse to find or confirm the address of the receiver's service provider. Similarly, receiving servers could verify the integrity of sending servers through the clearinghouse. In this way, any attempt to initiate a Summa message and transaction through an unauthorized server is automatically thwarted. Those skilled in the art will also readily identify other common security and data gathering functions that would conveniently be managed by the clearinghouse servers.

Figure 5:
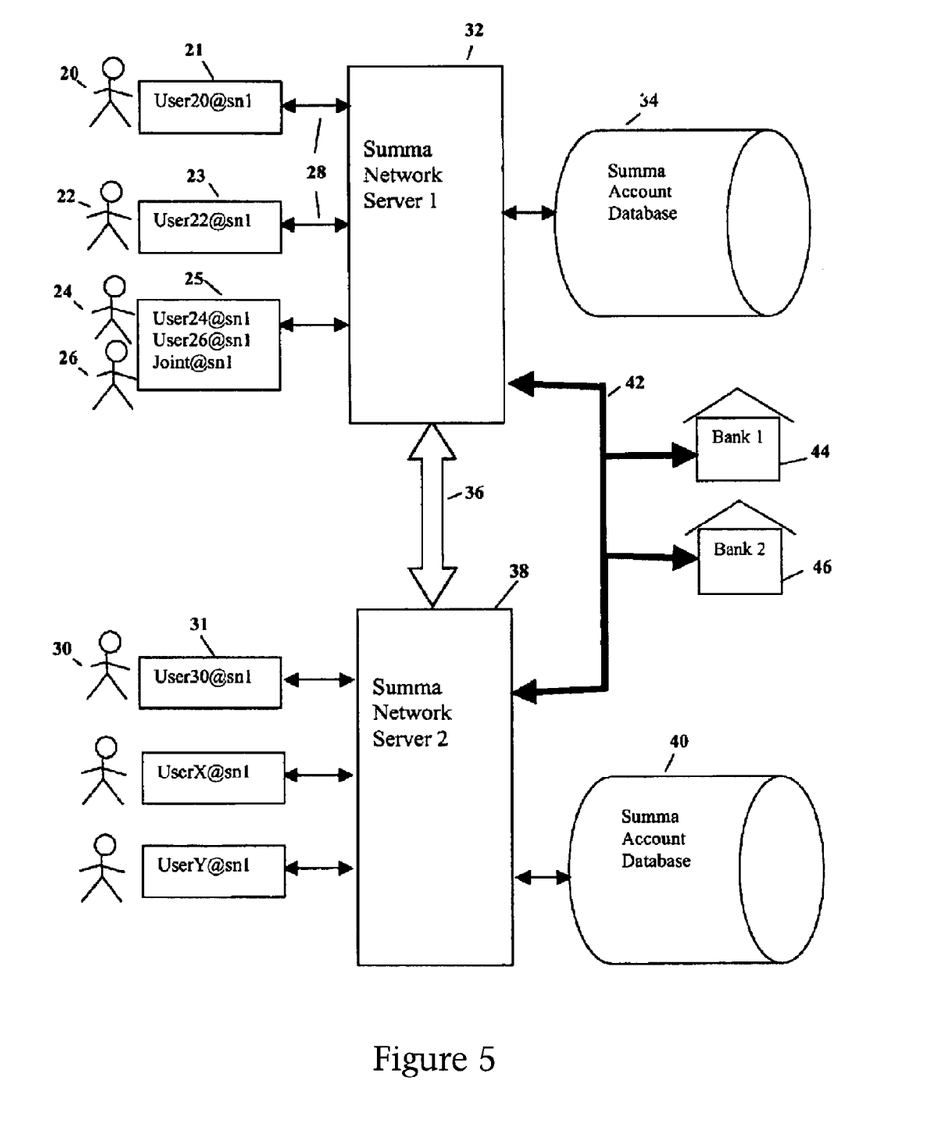
FIG. 5 is a block diagram similar to FIG. 1 but with the financial accounts residing outside the Summa network database, according to the invention, illustrating how the ability to complete a funds transfer may be provided with authorization and access to electronically order transfers of funds to and from a user's financial account held an external financial institution.

In the preferred embodiment illustrated in FIG. 1, the messaging system is integrated with the electronic funds transfer and accounting system of a financial institution. Alternatively, as shown in FIG. 5, the Summa transaction is completed using an external electronic component 42 for ordering a transfer of funds. For example, if user 20 has an account at bank 44 which provides internet banking access, user 20 can provide his user ID and password to his Summa client 21 which can then be used by the user's server 32 to access and transfer funds through the internet banking interface 42 for the selected bank account. Typically, a record of these transfers would still be kept in the Summa account database 34. In such a case, while the Summa messaging system is not actually integrated into the bank's financial accounting systems, sufficient access and control the financial account can be granted to the Summa system to complete the fund transfers required to serve the purposes of this invention.

Alternatively, or in addition, the user could sign an agreement allowing the provider of the Summa messaging service authorization to make automated clearing house (ACH) transfers to any of the user's existing accounts. In this alternative embodiment, the means of transferring funds 42 represents any means of electronic funds transfer, including but not limited to the ACH system, a credit card processing system, individually or in combination with a clearinghouse 50, through which the Summa network servers may coordinate the transfer of funds between financial accounts. For example, in the case where an ACH transaction will be involved, the user's selected account routing number would be provided through the user's Summa client. Since ACH transactions are typically processed using batch files, it may not be necessary or advisable to create an ACH transfer order for each discrete Summa message. For example, assume that during one day, user 20 has made ten Summa payments and received thirteen Summa payments, with a net gain of $5.31. In this case, the network server would accumulate a daily transfer tally in the database 42 representing the sum of credits and debits to each Summa account. Rather than issue 23 ACH transactions for user 22, the network server would order one ACH transaction, a credit of $5.31, at the end of the day. This process not only reduces ACH transaction fees, it also reduces the number of financial transactions that need to be represented in a banking statement. Because the total funds credited and debited, including service fees, must balance at the end of each day, this system is further simplified by directing all end of day Summa account credits into a central financial account owned by the service provider and directing all end of day Summa account debits out of the same central financial account. In this alternative embodiment, the user's bank statement would show only a single ACH transaction for each day representing the net Summa account credits or debits for that day. The details of each transaction, however, could be accessed through the Summa account database, which in the case of the example above would show the detail of User 20's ten outgoing Summa payments and thirteen incoming Summa payments. Alternatively, instead of balancing each account daily, the service provider could wait to balance each user's account only when the net credit or debit exceeded a minimum amount, for example $20, which would be sufficient to justify the expense of an ACH transfer fee. A similar process may be used when accessing a line of credit, using for example, a credit card number.

In another embodiment, the shift in net balances may occur between the accounts of a single service provider who owns financial account in multiple financial institutions, 44 and 46, shown in FIG. 5. To minimize transactions between 44 and 46, users might be required to have their own financial accounts controlled by their Summa account, at least the one that will receive and pay small amounts, at 44 or 46. In this alternative, User 22 may have selected bank 44 and User 30 bank 46, and both have Summa accounts managed by one service provider operating network servers 32 and 38. With the appropriate permissions from the Summa users, and by way of service provider's accounts at each bank, payments between 22 and 30 may be completed without any transfer of funds between banks Instead, the funds paid out by 22 go into the service provider's account at 44 and out of the service provider's account at 46 into 30's account. In this way, at reduced cost, two in-bank transfers replace one between banks transfer. In this case, the net deposits in each bank remain unaffected, but the service providers'accounts at each bank are affected. This is easily managed by periodic ACH transfers between the service provider's own accounts at 44 and 46 which may be required only infrequently. This process may again be coordinated by a Summa clearinghouse, 50, which is implicitly included in electronic funds transfer means 42.

In several of the settlement scenarios, described above, users may be required to authorize the service provider to consolidate debits and credits in escrow accounts. The escrow accounts exist in the form of files stored on the network servers or clearinghouse servers 50. In combination with a record of the current balance in each account, the network server can use the running-escrow account to verify sufficiency of funds available and to prevent an overdraft. Typically, the escrow may consist of two parts: pending transactions and completed transactions. Pending transactions involve those funds that are committed to be paid upon delivery of a Summa message that is in the delivery queue but has not yet been delivered—perhaps because the receiver has not yet downloaded his Summa messages. Funds authorized for payment in pending transactions are held in escrow since they not available to either the sender or receiver. If (a) the delivery is rejected, (b) the sender cancels the delivery, or (c) the sender chose the option of putting a time limit on delivery after which delivery attempts will cease, the escrowed funds associated with that message will be returned to the sender's account. Otherwise, once the network server receives confirmation of the delivery, the payment between sender and receiver is finalized by recording a shift from a pending to confirmed debit in the sender's escrow account and recording a confirmed credit into the receiver's account. By combining the last day's settlement balance with the current day's confirmed credits and deducting both pending and confirmed debits, the network server can provide a Summa user with a real time balance of available funds. As described previously, end of day batch files may be used to settle the net deposits held by financial institutions or service providers. In this example, the end of day batch settlement would include the cumulative confirmed debits and confirmed credits held in the escrow accounts. Any pending transactions would remain in the escrow account until delivery, cancellation, or refusal of the Summa message.

Another important feature of the present invention is that, with the permission of users, the service providers can also track the types of purchases made and add this to the marketing database kept on each user. Additional marketing information may be collected by providing users opportunities to complete surveys. Demographic, purchasing, and survey data may be retained on the network server or communicated to a central clearinghouse or centralized data center that stores cumulative marketing data 50. Collecting and making this data available increases the value of each user's market identity and thereby increases the income that users will be able to receive from receipt charges.

Traditionally, for example, after a consumer has bought a product he will frequently receive additional product offers from the seller. In addition, his contact information and market profile may also be sold to other marketers, to the financial benefit of the seller, not the consumer. By contrast, while Summa purchases will also mark a consumer as a "hot prospect," the financial benefit of the enhanced market identity associated with being a buyer flows to the consumer who will receive his required receipt charge for any additional marketing offers delivered via a Summa message. To maximize the value of the user's Summa account, use of the marketing data may be restricted to offers made through a Summa message. Alternatively, the service provider could act as a broker for sale of marketing information and credit each Summa user with a payment each time a marketer purchased data, including mail addresses or telephone numbers, associated with the consumer. Once the marketing data is collected into an electronic database, it is a simple matter to allow marketers to select prospect lists by entering selection criteria into a program that will extract the desired list of prospects. Such data mining is a common practice familiar to those skilled in the art of programming and does not require further elaboration. Furthermore, those skilled in the art of network design will immediately see that the clearinghouse and the centralized database for marketing information may be either separate or combined without compromising the functionality of the described system.

It is to be understood that the foregoing general description and the following detailed descriptions are exemplary and explanatory but are not to be restrictive of the invention. Once the general method of linking financial accounts and messaging accounts, establishing receipt charges, and tracking credits and debits has been revealed in this disclosure, a large number of methods of implementing this process will be obvious to those skilled in the arts of computer network programming, database programming, and electronic mail programming.

Elaborations on the Basic Invention

The essence of this invention is found in the linking of financial accounts through network servers wherein the financial accounts are controlled through a secure electronic messaging service that allows users to transfer funds and establish receipt charges. Once this mechanism is provided, implementation of additional variations beneficial for particular applications will be obvious to those skilled in the art. Many of these additional features may be implemented by headers included with the Summa message that facilitate this process or provide additional functions. Through variations such as those described below, virtually any business or accounting practice done through traditional paperwork may be accommodated and made more efficient while still giving users greater control over their communications and financial transactions.

First, as described previously, the header could include a field identifying the maximum charge that the sender is willing to pay as a receipt charge. If the maximum charge, for example, is ten cents and the receiver's delivery charge for receipt of messages in that commercial category is five cents, only five cents would be charged against the sender's account and credited to the receiver. On the other hand, if the receiver's receipt charge was twenty cents, the message would not be delivered and the sender would be notified of the higher charge for delivery.

Second, it would be most convenient if the header included an identification of the commercial category under which the sender's Summa message should be classified. By contractual arrangement, users (both as receivers and senders) would agree to provide information used for accurate classification of commercial offers and would be bound by the decisions of this classification system.

Third, a header element might identify the amount that will be charged to the receiver if he decides to respond to the message that he has just received. In commercial applications, for example, the receiver might be notified that he will not be charged anything if he responds to the sender with an inquiry for more information. Alternatively, the sender can set the charge for responding to an amount equal to the purchase price of the product offered to the receiver. In this way, the exchange of two Summa messages (the offer and the acceptance in response) can be use to complete a financial transaction. The response charge may be different than the normal receipt charge and may revert to the normal receipt charge after a specified period of time.

Fourth, the header could include an additional field identifying a full credit transfer amount that should be fully transferred to the receiver's Summa account. If so designated, this full credit transfer amount may be transferred even if the receiver's receipt charge is less than the designated full credit transfer amount. In this manner, the sender may transfer funds to any user of a Summa account in order to pay a bill, purchase a product, give a refund, send a monetary gift, or any other purpose for which funds are transferred.

Fifth, the header may include information identifying types of messages that should be displayed or processed in specific ways. In this example, message tagged as an invoice document type might be structured in such a way that the invoiced item numbers, description, quantity, per piece charge, and total charges can be automatically captured by the receivers accounting software. XML and XHTML are formatting languages that might be easily adapted for this purpose. The Summa client would recognize the invoice header and present the message to the user as an invoice with the options to either (1) pay the charge in full by authorizing a full credit transfer amount equal to the invoiced amount, or (2) pay a partial amount toward the invoice, or (3) respond with a message disputing the invoice. Using the header information in the original message, the response message could automatically include the invoice number and other information in a standard format that could automatically interpreted by the sender's accounting software to make proper adjustments to the account. Similarly, a header for a contract document type might display with a "sign and send" button offering the receiver would digitally sign the document with a digital identification and return the signed document to the sender. Many other document types, including purchase orders, spreadsheets, surveys or polls, paginated e-books, application forms, tax forms, documents that are wholly or in part audio or video files or executable code that should be processed in a predefined way, and any number of document types and forms that are typically used in business, government, non-profit, or private transactions.

Sixth, a header might be used simply to identify to network servers that the sender is requesting notice of the intended receiver's receipt charge. This "query of charge" message would not be delivered to the potential receiver, but would simply be used to generate an automatic response from the Summa delivery subroutine providing a notice of the receiver's appropriate charge, even if that charge is zero. The service provider might collect a fee for this query.

Seventh, additional features may also be employed in each user's database, FIG. 2, to provide further control over how many commercial messages, how much receipt income is desired, and to "pull" commercial messages when they are most needed. For example, users could identify the maximum number of Summa messages they wish to receive from any particular commercial classification over the course of a week or a month. If for example, the user receives dozens of lawn fertilizer offers a week, and is indeed interested in these but simply overwhelmed by them, he might enter into a field of his charge schedule a limit on receipt of such message to no more than six per week. Alternatively, the network server could be instructed to put all such Summa messages into a queue every week and to deliver at the end of the week only those six who offered to pay the highest receipt charges. In this manner, commercial vendors could be asked to "bid" for the attention of a potential customer. Conversely, a user may set the minimum amount he desires to earn each week from receipt charges. If the desired amount is not met during the last hour, the network server would be instructed to accept the highest bidders who have authorized less than the receipt charge normally required by the user but have also chosen to leave their messages in a holding queue until such time as the receiver might be willing to accept them at their proffered rate. Similarly, commercial advertisers may pre-authorize the delivery of messages to any Summa user who will subsequently match their selection criteria. For example, a marketer of cookbooks may preauthorize sending an ad immediately, or at a preset interval, perhaps one day, after a user has made a purchase of cooking supplies. Preauthorized Summa messages would also facilitate the ability of users to pull marketing information when they need it. For example, while users are not always interested in home mortgage rates, sometimes they are very interested in finding the best mortgage rate. Normally, to discourage receipt of mortgage information they might set a high receipt charge. When they want to get information from competitive companies, however, they could lower their receipt charge to a more reasonable level. In addition, however, the Summa client could provide a special document type that represents an "announcement of interest" (AI) or "bid request" that signifies a desire to receive information, bids, or quotes on the subject matter identified. In one alternative, this AI might be broadcast to all commercial Summa users who request delivery of AI's in their category of interest. Alternatively, the AI may be processed by a central server that matches the AI request to pre-authorized messages that commercial Summa users have prepared to respond to any matching AI request. In all of these exchanges, the consumer and commercial user may set maximum delivery charges or receipt charges as best they deem. Of course, service providers might also apply additional charges.

Eighth, this invention also facilitates the use of multi-layered marketing efforts. For example, a company selling saunas might be willing to pay only five cents per potential customer in a "qualifying" mailing to a million people. The message would explain what the company was offering and promise an additional credit of $5 if the receiver, after reading this initial message was interested enough to "click here" and examine more of the company's materials. Upon activating the "click here" link, the user's Summa client would automatically generate a request for more information to be sent to the sender. The sender would then respond with a second Summa message containing additional information, including perhaps a video clip attachment, and the promised full credit transfer amount of $5. Alternatively, the customer might be directed to click through to a special advertising page at the company's internet site which would display the sales pitch and afterwards provide the user with a form to fill out, including his Summa account information to which a Summa message providing the $5 credit would be sent.

Ninth, another variation is to allow users to set receipt charges to a negative number. This signals a reverse payment, namely the receiver's authorization to pay the sender for each Summa message received. This would be useful as a means of paying for each issue of a newsletter, for example. The negative receipt charge would be compared to the negative number set in the sender's maximum receipt charge field. If the receiver's authorized payment was not sufficient, the newsletter would not be delivered. In this way, users could easily cancel a subscription by replacing the negative number with a positive number, while information providers can also be certain they collect their payments for each issue delivered.

Tenth, to strengthen security, the transfer of Summa messages would typically involve a much different communications protocol than the POP3 and SMTP methods used by standard email clients and servers. In a typical embodiment, the transfer of messages between Summa clients and the Summa network servers, and between Summa network servers, may include encryption, compression, requests to send, permissions to send, challenge and response, message hashes, certificates of authority, identity verification, and other techniques well known to computer security specialists. These techniques would be used individually or in combination to ensure that the identified sender did actually authorize the sending of funds and to ensure confidential delivery of the funds and message to the intended receiver. While the specialized Summa client would be required to generate Summa messages in accord to this secure protocol, the Summa client can also include programming to handle create, download, and read POP3/SMTP email. This backward compatible functionality allows Summa users to continue to receive POP3 email from persons on their pass through list who do not have Summa accounts and also to send SMTP messages to these same persons from their Summa client.

Eleventh, the marketing data collected in the Summa Account Databases 34 and 40 is a valuable commodity for data mining, segregation, and selects that will identify subsets of Summa users that marketers would most wish to send their commercial offers. According to this invention, this marketing data can be made available either through each individual Summa network server or it can be collected into a centralized database from which marketers may extract data. The methods of compiling, searching, and distributing data from such a database are well known to those skilled in the art and require no additional elaboration here.

Twelfth, just as HTML provides a mechanism to launch an email client to send a message to a predetermined address, special web page programming can be devised for a hyperlink to launch a Summa message transferring a predetermined credit to a predetermined user. The buyer and seller would simply both need Summa accounts. Programming for a Summa hyperlink would launch a Summa message authorizing the payment to the seller, most probably including in the message information to the seller identifying the item being purchased. In a typical application, the buyer would confirm the purchase, most probably with a password, and the Summa transaction would be completed. If a shipping address were required, this could automatically be provided from the buyer's database. This method provides an easier means of completing Internet purchases without the need for filling out contact information and revealing a credit card numbers. A similar method could be employed for a micropayment system. For example, in order to gain access to web pages containing information of value, a special hyperlink displaying the cost of following the hyperlink would, when activated, simultaneously take user to the desired page and authorize a Summa payment of the few cents, or even fractions of cents, required. In this example, the user would probably set a maximum amount, say 5 cents, that he was willing to have paid without the need of a confirming the purchase with a password. In this way Summa account users could easily have access to web sites requiring micropayments for browsing of their content.

Thirteenth, in many applications it may be useful to provide or require a digital identification (DI). For example, a DI may be provided by the sender with a contract bid, or with a filing and payment of taxes. In this case, the sender would simply choose the option of attaching the DI to the Summa message and the receiver would be able to see if any message had a DI or not. Conversely, senders might require a DI from receivers prior to delivery of the Summa message. This is analogous to sending a registered mail or a legal notice wherein the receiver must sign for delivery or even produce a government or corporate ID. To implement this option, the sender of a Summa message may be provided with the option to condition delivery upon provision of a general or specific DI. The task of supplying the DI may be automated or semi-automatic. Most typically, the receiver would electronically deposit one or more digital identifications in his Summa client or his network server so they would be ready to be used at any time. For example, the sender may require either a digital signature and/or a confirmation of identity in the form of a specific CA prior to delivery the Summa message. In this example, the message would be put into a hold queue and the network server would send a request for the required DI to the receiver's network server. If the receiver configured his end to automatically fill all DI requests, the receiver's network server would automatically send the DI to sender's network server. If required, the sender or the sender's network server would use the issuing party's public key to confirm the authenticity of the CA. Upon confirming the identity of the receiver, the queued Summa message would then be released for delivery under the usual conditions. Alternatively, if required by the sender or by the option of the receiver, the DI would only be provided when the receiver authorized delivery in each instance by manually confirming permission to provide the DI by clicking on an appropriate button or icon. In this case, the receiver would not receive the original Summa message itself at this time, but only a notice of the request for the DI, which might include the name of the requester. Typically, the notice of the request for DI prior to delivery of the queued message would be treated as a special document type that, upon display, would include buttons that allow for easy approval of the request. This request, however, could also be treated as a separate Summa message for which the appropriate receipt charge would apply.

Fourteenth, it is possible to further increase the value of the marketing data collected, and thereby the income users can receive from receipt charges, by collecting additional information about purchasing habits from other financial transactions. For example, the type of data normally collected on debit and credit card sales at a retail establishment could be linked to each user's database. Alternatively, a new type of credit or debit card issued by the service provider may be used as a token, or smart card, to authenticate a Summa transaction at a dedicated transaction terminal at the checkout lane of a retail establishment. In this example, the token might contain an encrypted CA that would be verified by the terminal, which may also provide for entry of a user's password. Upon confirmation of the sale by the user, the terminal would generate a Summa message that would pay for the purchase and upload a list of the user's purchases to the network server. In this example, the checkout terminal acts is simply a dedicated Summa client accessible to any user who identifies himself to the terminal with an appropriate encrypted token and password. Similar tokens may also be used as an additional security precaution whenever a user wants to access his Summa account from a networked device that the Summa network would recognize as not being one of his "normal" access points. Implementation of the above and similar schemes for completing financial transactions in a manner that accumulates valuable marketing data will be obvious to those skilled in the electronic arts. This invention is unique, however, in that the marketing data is accumulated to the financial benefit of the consumer.

Finally, it is important to note that while this system can be effectively implemented by means of network servers and Summa clients, it will be obvious to those skilled in the programming arts that the same general methods can be used to implement this invention through server based application software or a web based site, in a fashion similar to the way that the Hotmail web-based email site is commonly used as a substitute for using Outlook Express to view email stored on a network server.

Additional Ramifications

This invention opens the way for a number of new methods and models for doing business. For example, internet service providers may be able to waive subscription fees for user in return for a service fee levied against their user's receipt charges or fund transfers. Tech support centers can use a Summa account to collect an advance payment for a request for help. Companies may set receipt charges for the Summa accounts of their employees, and thereby collect on the value of outsiders contacting their employees. This income would help to offset the cost of providing communication tools to employees and creates added value from their employees.

As will be apparent to those skilled in computer programming, Summa accounts can easily be programmed to satisfy many standard business practices. For example, Summa accounts can be multiplexed, that is several financial accounts can be linked to a single user's address. In this case, the user might use a single Summa client to retrieve all of his messages but when sending a Summa message the user would be allowed to choose from which of the multiple financial accounts available funds should be drawn to pay the receipt charge or other payment. Conversely, the user addresses for multiple users, such as a husband and wife, could be linked to a joint financial account. The system can also be easily modified to require two or more users to authorize a payment. For example, an electronic Summa invoice might be sent to a company's accountant. Upon verifying the invoice, the accountant may then authorize the payment, but the message would not be sent directly to the receiver but would instead be automatically routed to "co-signer" for the account, the business owner. The Summa message, including the payment, would only be sent after the business owner confirmed it for delivery.

Because all the Summa account records are in an electronic format, it is also obvious that this accounting information can be easily read or imported into accounting software. Alternatively, accounting software can be incorporated into the Summa client. Upon review of what is taught in this invention, it will be readily apparent to anyone skilled in the programming and accounting arts that any standard for handling multiple accounts, multiple signers, tracking of expenses and payments, collection of customer histories, et cetera, can be accomplished or mimicked through minor variations in the programming governing general or special purpose Summa accounts.

Conclusion

The techniques disclosed by this invention produce the following advantages:

they increase the value of a user's identity and time and provide the user with greater control over the type and quantity of electronic messages received;

they correct the inherent weakness in the prior art which provided no practical means of regulating the quantity and quality of email messages received and no practical way of generating income for the user;

they reduce the impulse of users to keep their email addresses secret for fear of being inundated with unwanted email messages thereby promoting a more public posting of addresses that will facilitate appropriate communication;

they provide a new manner of engaging in financial transactions over a computer network through a system of technological and contractual business relationships between users and their service providers;

they provide a more open structure for commercial email messaging and identification of customer interests, improving rapport between businesses and customers by eliminating the sense that users are being "hassled" with unwanted email messages; and they provide a new source of revenue for service providers, reducing the cost of their services, and opens up new avenues for business development along the model used by telephone companies, banks, and credit card companies.

Although the description above contains many embodiments and precise examples, these should not be construed as limiting the scope of the invention but merely provide illustrations of some of the principle ways in which the invention can be implemented. Once disclosed, customizing of this process to suit the individual needs of users and service providers will be obvious to one skilled in the art. For example, the Summa client may be embedded in a cell phone or other networked electronic device. Similarly, receipt charges may be applied to receiving phone calls, another form of electronic messaging.

Thus, the foregoing is considered as illustrative of the principles of the invention, but is not by any means exhaustive. Numerous modifications and changes will be obvious to those skilled in the art. Therefore, it is not desired to limit the invention to the exact construction and process shown and described herein, and accordingly, all modifications and equivalents which utilize a user accessible switch which limits a computer's access to its peripheral devices fall within the scope of this invention.

What is claimed is:

1. A method of collecting marketing information, the method comprising:
   providing a processor for communication over a network with a user computer;
   providing a memory in communication with the processor, the memory comprising a data structure, the data structure comprising data corresponding to a plurality of user accounts;
   wherein each of the plurality of user accounts comprises a user account identifier and a financial account identifier corresponding to a financial account, each financial account comprising an account balance;

receiving, in the processor, a proposed electronic transaction comprising a first user account identifier associated with a first user account, a selection criteria, and a message;

identifying, in the processor, a second user account that meets the selection criteria;

wherein the first user account and the second user account are user accounts in the plurality of user accounts, and wherein the second user account comprises a market profile, and a message store;

determining, in the processor, whether a predetermined condition is met;

if the predetermined condition is not met: rejecting the proposed electronic transaction;

if the predetermined condition is met: (1) delivering the message to the message store associated with the second user account, (2) adjusting the account balance associated with the first user account by a first amount, and (3) after receiving, in the processor, a request to access the delivered message in the message store associated with the second user account, adjusting the account balance associated with the second user account by a second amount; and storing, in the data structure, information related to the transaction in the market profile associated with the second user account.

2. The method of claim 1:

wherein the proposed electronic transaction further comprises a maximum charge;

wherein the second user account further comprises a receipt charge; and wherein the predetermined condition is met if and only if the receipt charge does not exceed the maximum charge.

3. The method of claim 2 wherein the first amount is negative and the absolute value of the first amount is greater than or equal to the receipt charge; and wherein the second amount is positive and less than or equal to the maximum charge.

4. The method of claim 2 wherein the maximum charge depends on the data associated with the second user account.

5. The method of claim 2 wherein the first user account comprises a commercial category identifier or the proposed electronic transaction comprises a first commercial category identifier;

wherein the second user account further comprises a schedule of receipt charges, the schedule comprising a plurality of commercial category identifiers, each commercial category identifier having a corresponding applicable receipt charge;

wherein the first commercial category identifier is in the plurality of commercial category identifiers in the schedule; and wherein the processor is further configured to (4) determine a first applicable receipt charge based on the schedule of receipt charges and the first commercial category identifier, and (5) use the first applicable receipt charge when determining whether the predetermined condition is met.

6. The method of claim 1 further comprising performing the following steps:

receiving, in the processor, a second proposed electronic transaction comprising a user account identifier corresponding to the second user account, selection criteria identifying the first user account, and a second message;

delivering the second message to the message store associated with the first user account;

receiving, in the processor, a request to access the second message in the message store associated with the first user account, adjusting the account balance associated with the second user account by a third amount; and adjusting the account balance associated with the first user account by a fourth amount.

7. The method of claim 1 further comprising:

receiving, in the processor, a second proposed electronic transaction comprising a user account identifier corresponding to the second user account, a second selection criteria, and a second message;

identifying, in the processor, a third user account that meets the second selection criteria, wherein the third user account is in the plurality of user accounts and the third user account comprises a message store;

delivering the second message to the message store associated with the third user account;

receiving, in the processor, a request to access the delivered second message in the message store associated with the third user account;

adjusting the account balance associated with the second user account by a third amount; and adjusting the account balance associated with the third user account by a fourth amount.

8. The method of claim 1 wherein the proposed electronic transaction comprises a third amount, and wherein the processor is further configured to calculate the second amount based on the first and the third amount.

9. The method of claim 1 wherein the first amount is positive and the second amount is negative.

10. The method of claim 1 wherein the selection criteria comprises at least one selected from the group consisting of name, zip code, and market profile data.

11. The method of claim 1 wherein the first user account comprises a market profile, the method further comprising:

storing, in the data structure, information related to the transaction in the market profile associated with the first user account.

12. A system for collecting marketing information, the system comprising:

a processor for communication over a network with a user computer; and a memory in communication with the processor, the memory comprising a data structure, the data structure comprising data corresponding to a plurality of user accounts;

wherein each of the plurality of user accounts comprises a user account identifier and a financial account identifier corresponding to a financial account, each financial account comprising an account balance;

wherein the processor is configured to execute a program, the program being configured to perform the following steps:

(1) receive a proposed electronic transaction comprising a first user account identifier associated with a first user account, a selection criteria, and a message;

(2) identify a second user account that meets the selection criteria;

wherein the first user account and the second user account are user accounts in the plurality of user accounts, and wherein the second user account comprises a market profile, and a message store;

(3) determine whether a predetermined condition is met;

(4) if the predetermined condition is not met: reject the proposed electronic transaction;

(5) if the predetermined condition is met: deliver the message to the message store associated with the second user account; and
(6) store, in the data structure, information related to the transaction in the market profile associated with the second user account.

13. The system of claim 12:
wherein the proposed electronic transaction comprises a maximum charge;
wherein the second user account comprises a receipt charge; and
wherein the predetermined condition is met if and only if the receipt charge does not exceed the maximum charge.

14. The system of claim 13 wherein the program is further configured to:
(7) adjust the account balance associated with the first user account by a first amount;
(8) after receiving a request to access the delivered message in the message store associated with the second user account, adjust the account balance associated with the second user account by a second amount.

15. The system of claim 14 wherein the first amount is positive and less than or equal to the second amount; and
wherein the second amount is negative and the absolute value of the second amount is greater than or equal to the receipt charge.

16. The system of claim 14 wherein the first amount is negative and the absolute value of the first amount is less than or equal to the maximum charge; and
wherein the second amount is positive and less than or equal to the receipt charge.

17. The system of claim 14 wherein the processor is further configured to perform the following steps:
receive a second proposed electronic transaction comprising an identifier corresponding to the second user account, a selection criteria identifying the first user account, and a second message;
deliver the second message to the message store associated with the first user account; receive a request to access the second message in the message store associated with the first user account,
adjust the account balance associated with the second user account by a third amount; and
adjust the account balance associated with the first user account by a fourth amount.

18. The system of claim 14 wherein the processor is further configured to perform the following steps:
receive a second proposed electronic transaction comprising an identifier corresponding to the second user account, a second selection criteria, and a second message;
identify a third user account that meets the second selection criteria, wherein the third user account is in the plurality of user accounts and the third user account comprises a message store;
deliver the second message to the message store associated with the third user account;
receive a request to access the delivered second message in the message store associated with the third user account;
adjust the account balance associated with the second user account by a third amount; and
adjust the account balance associated with the third user account by a fourth amount.

19. The system of claim 13 wherein the message further comprises an expiration time, and wherein the program is further configured to perform the following steps:
(7) compare the expiration time associated with the delivered message in the message store associated with the second user account to the current time; and
(8) if the expiration time is less than the current time, to reject the proposed electronic transaction.

20. The system of claim 13 wherein the first user account comprises a commercial category identifier or the proposed electronic transaction comprises a first commercial category identifier;
wherein the second user account further comprises a schedule of receipt charges, the schedule comprising a plurality of commercial category identifiers, each commercial category identifier having a corresponding applicable receipt charge;
wherein the first commercial category identifier is in the plurality of commercial category identifiers in the schedule; and
wherein the program is further configured to (7) determine a first applicable receipt charge based on the schedule of receipt charges and the first commercial category identifier, and
(8) use the first applicable receipt charge when determining whether the predetermined condition is met.

21. The system of claim 20 wherein the second user account comprises data corresponding to the number of messages associated with the first commercial category previously received; and
wherein the program is configured to determine the first applicable receipt charge based on the data corresponding to the number of messages associated with the first commercial category previously received.

22. The system of claim 13 wherein the maximum charge depends on the data associated with the second user account.

23. The system of claim 13, wherein the information related to the transaction that is stored in the data structure in the market profile associated with the second user account comprises information selected from the group consisting of purchase history, transaction history, survey responses, sent messages, and received messages.

24. The system of claim 13 wherein the proposed electronic transaction comprises a hyperlink, wherein the program is configured to receive an indication that the hyperlink has been activated by a user computer associated with the second user account, and wherein the predetermined condition is met only if the program has received the indication that the hyperlink has been activated.

25. The system of claim 13 wherein the proposed electronic transaction further comprises an identification of a payment amount;
wherein the program is further configured to:
(7) adjust the account balance associated with the first user account by a first amount, wherein the first amount is based on the payment amount and the receipt charge; and
(8) after receiving a request to access the delivered message in the message store associated with the second user account, adjusting the account balance associated with the second user account by a second amount, wherein the second amount is based on the payment amount and the receipt charge.

* * * * *